Patented Aug. 12, 1941

2,252,658

UNITED STATES PATENT OFFICE 2,252,658

PREPARATION OF STEARATES AND PALMITATES

Maurice H. Bigelow, Toledo, Ohio, assignor to Plaskon Company, Incorporated, Toledo, Ohio, a corporation of Delaware No Drawing. Application June 24, 1938, Serial No. 215,709

5 Claims. (Cl. 260—414)

The invention relates to the preparation of stearates and palmitates and zirconium, titanium and cerium. These compounds are salts of weak acids with very weak bases, and therefore are difficult to prepare and are easily hydrolyzed.

The principal object of the invention is the preparation of substantially unhydrolyzed stearates and palmitates of extremely weak bases. More specific objects and advantages are apparent from the description, which merely discloses and illustrates the invention and is not intended to impose limitations upon the claims.

The substance that has been marketed heretofore as zirconium stearate is of a distinctly gummy character. It tends to become lumpy during storage and shipment, and it is so gummy that it cannot be dispersed satisfactorily by grinding it with a powdered material in a ball mill. When an attempt is made to incorporate it as an ingredient in a powdered molding composition by grinding it in, it remains in lumps or agglomerations, which appear as white specks in the surface of a molded article made from the molding composition.

When zirconium stearate is prepared in accordance with the invention, it is obtained in the form of a fluffy powder that shows no signs of gumminess and is easily dispersed with other powders by grinding. This powder is believed to be the first non-gummy form of zirconium stearate.

The gumminess of the material that has been marketed heretofore as zirconium stearate is caused by the presence of a substantial amount of stearic acid. The presence of this stearic acid has not been suspected, however, because the stearic acid is produced by hydrolysis of the zirconium stearate into zirconium hydroxide and the acid. The difference between unhydrolyzed zirconium stearate and partially hydrolyzed zirconium stearate was not appreciated until the unhydrolyzed substance was produced in accordance with the invention and was found to be non-gummy.

Unhydrolyzed titanium and cerium stearates also have not heretofore been available, and may be prepared in accordance with the invention. Palmitates may be produced in the same manner as stearates.

When commercial stearic acid is employed as one of the starting materials, the final product is a mixture of stearates and palmitates, because commercial stearic acid contains a considerable proportion of palmitic acid. The terms "stearates" and "palmitates" as used herein include hydroxy stearates and hydroxy palmitates.

Salts of zirconium, titanium and cerium dissolve only in strong acids. It might be supposed that stearates or palmitates of these metals could be produced by mixing solutions of the metal salts with solutions of a soap of stearic or palmitic acid, just as insoluble calcium soaps are precipitated when a soap solution is added to hard water. When a solution of a salt of one of the three metals is added to a solution of a soap of stearic or palmitic acid, however, high acidity of the salt solution causes free stearic or palmitic acid to precipitate. Heretofore it has been considered impossible to prepare a substantially neutral solution of a zirconium, titanium or cerium salt. Strongly acid solutions of the salts have been prepared, and attempts to reduce the acidity of such solutions by neutralizing or diluting them have heretofore caused hydrolysis of the salts and precipitation of the insoluble hydroxides.

In accordance with the invention, substantially neutral solutions of the salts may be prepared without precipitation of the hydroxides. A solution of the salt in sulfuric acid is first prepared, and a suitable barium compound is then added, until the solution has been neutralized to the desired degree.

In order to avoid precipitation of hydroxides, barium carbonate, barium hydroxide, barium oxide, or barium sulfide must be employed. When the carbonate or sulfide is added to the sulfuric acid solution, carbon dioxide or hydrogen sulfide is evolved. Barium hydroxide or barium oxide reacts with sulfuric acid to form barium sulfate without the production of any acid as a by-product. Among the barium compounds suggested, barium carbonate is preferred, because it dissolves readily in the sulfuric acid solution, and because the termination of the reaction can be observed by watching for the evolution of carbon dioxide to cease. Moreover, carbon dioxide is not offensive like hydrogen sulfide.

If the solution of the salt, after the addition of the barium compound, is to be mixed with a soap solution in order to precipitate a stearate or palmitate, the amount of the barium compound that should be added is simply an amount which reduces the acidity of the solution enough so that the stearate or palmitate is precipitated substantially free from stearic or palmitic acid. Preferably, the quantity of the barium compound added to the sulfuric acid solution before the mixing of the two solutions is sufficient to bring the sulfuric acid solution approximately to neutrality, e. g., to a pH of 6-6.5.

Cooling the sulfuric acid solution before the addition of the barium compound and cooling the soap solution are very helpful toward inhibiting hydrolysis.

An anti-flocculation agent, such as fine clay, may advantageously be incorporated with pure stearates or palmitates prepared in accordance with the invention before they are shipped.

If desired, the barium sulfate that precipitates when the barium compound is added to the sulfuric acid solution may be allowed to remain in the neutralized solution, so that the final product is an intimate mixture of barium sulfate with the palmitate or stearate. The barium sulfate which is thus allowed to remain mixed with the solid stearate is believed to have excellent anti-flocculation properties.

A mixture of barium sulfate with zirconium stearate substantially free from stearic or palmitic acid embodying the invention may be prepared as follows:

(1) *Preparation of soap solution*

Commercial triple-pressed stearic acid (10 parts) is melted together with 1 part of water. (The water floats the stearic acid and prevents scorching.) The melted stearic acid is then poured into a solution of 1.5 parts of technical caustic soda flakes in 10 parts of water, contained in a stainless steel tank. After the resulting soap has been agitated for one-half hour with live steam and an electric stirrer, a further quantity (85 parts) of water is added. The soap is then salted out of the solution with sodium chloride, and the solution is drained off and replaced by fresh water. In order to remove substantially all the free alkali, the salting out and redissolving of the soap should be repeated four or five times. When the final soap solution is obtained, stirring is recommenced, and the solution is allowed to cool.

(2) *Preparation of zirconium sulfate solution*

Crushed ice is added to a 20% solution of zirconium sulfate in sulfuric acid, containing 10 parts of zirconium sulfate. Stirring is commenced, and a paste containing equal parts of water and technical precipitated barium carbonate is added until a pH of 6.0 has been attained and effervescence has ceased.

(3) *Preparation of powdered product*

Crushed ice is added to the soap solution, and the two chilled solutions are mixed. The zirconium stearate and barium sulfate float to the top of the tank, and a considerable proportion of clear liquid may be drained off after two hours. The remaining liquid together with the precipitate is passed through a vacuum filter, and the resulting cake is made into a slurry with fresh water, refiltered, and washed four times with water. After the precipitate has been dried at 100° F. and 10% relative humidity, it is very fluffy and can easily be dispersed into other powders by grinding. The zirconium compound in the powder may consist largely of zirconium dihydroxy distearate.

Various embodiments of the invention may be devised to meet various requirements.

Having described my invention, I claim:

1. A method of preparing zirconium, titanium and cerium salts of stearic acid and palmitic acid substantially free from the acid that comprises adding to a sulfuric acid solution of a salt of the metal a substance selected from the group consisting of barium carbonate, barium hydroxide, barium oxide and barium sulfide, and then mixing the resulting solution with a solution of a soap of the acid.

2. A method of preparing zirconium, titanium and cerium salts of stearic acid and palmitic acid substantially free from the acid that comprises adding barium carbonate to a sulfuric acid solution of a salt of the metal, and then mixing the resulting solution with a solution of a soap of the acid.

3. A method of preparing zirconium, titanium and cerium salts of stearic acid and palmitic acid substantially free from the acid that comprises cooling a sulfuric acid solution of a salt of the metal, adding a substance selected from the group consisting of barium carbonate, barium hydroxide, barium oxide and barium sulfide, and then mixing the resulting solution with a cooled solution of a soap of the acid.

4. A method of preparing zirconium salts of stearic acid and palmitic acid substantially free from the acid that comprises cooling a sulfuric acid solution of zirconium sulfate, adding a substance selected from the group consisting of barium carbonate, barium hydroxide, barium oxide and barium sulfide, and then mixing the resulting solution with a cooled solution of a soap of the acid.

5. A method of preparing zirconium salts of stearic acid and palmitic acid substantially free from the acid that comprises adding to a sulfuric acid solution of a zirconium salt a substance selected from the group consisting of barium carbonate, barium hydroxide, barium oxide and barium sulfide, and then mixing the resulting solution with a solution of a soap of the acid.

MAURICE H. BIGELOW.